United States Patent
Tanaka et al.

(10) Patent No.: US 6,683,712 B2
(45) Date of Patent: Jan. 27, 2004

(54) OPTICAL AMPLIFICATION APPARATUS USING RAMAN AMPLIFICATION

(75) Inventors: Tomoto Tanaka, Sapporo (JP); Miki Onaka, Kawasaki (JP); Etsuko Hayashi, Kawasaki (JP); Yasushi Sugaya, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/192,528

(22) Filed: Jul. 11, 2002

(65) Prior Publication Data

US 2002/0181078 A1 Dec. 5, 2002

Related U.S. Application Data

(63) Continuation of application No. 09/858,509, filed on May 17, 2001, now Pat. No. 6,441,951, which is a continuation of application No. PCT/JP00/06102.

(51) Int. Cl.$^7$ .............................................. H01S 3/00
(52) U.S. Cl. ............................. 359/341.3; 359/334
(58) Field of Search .............................. 359/341.3, 334

(56) References Cited

U.S. PATENT DOCUMENTS

| | | | |
|---|---|---|---|
| 4,401,364 A | | 8/1983 | Mochizuki |
| 4,616,898 A | | 10/1986 | Hicks, Jr. |
| 4,805,977 A | | 2/1989 | Tamura et al. |
| 5,589,975 A | * | 12/1996 | Nakamura et al. ......... 359/345 |
| 5,633,749 A | | 5/1997 | Shibuya |
| 5,923,463 A | * | 7/1999 | Hamada ..................... 359/341 |
| 6,320,694 B1 | | 11/2001 | Ohshima |
| 6,501,595 B1 | * | 12/2002 | Drake et al. ............. 359/341.43 |

FOREIGN PATENT DOCUMENTS

| | | |
|---|---|---|
| EP | 1 018 666 | 7/2000 |
| JP | 7/240717 | 9/1995 |
| JP | 10-215016 | 8/1998 |
| JP | 2000-98433 | 4/2000 |

OTHER PUBLICATIONS

IEEE Photonics Technology Letter, vol. 11, No. 7, pp. 886–888 (1999) S. Kawai et al., "Wide–Bandwidth and Long–Distance WDM Transmission Using Highly GainFlattened Hybrid Amplifier".

Conference Proceedings. LEOS'97, 10$^{th}$ Annual Meeting. IEEE Lasers and Electro–Optics Society 1997 Annual Meeting, vol. 1, pp 224–225 (1997) P.B. Hansen, "Remote Amplification in Optical Transmission Systems".

24$^{th}$ European Conference on Optical Communication. ECOC'98, vol. 1, pp. 51–52 (1998) H. Masuda et al., "Wide–Band And Low Noise Optical Amplification Using Distributed Raman Amplifiers And Erbium–Doped Fiber Amplifiers".

* cited by examiner

*Primary Examiner*—Mark Hellner
(74) *Attorney, Agent, or Firm*—Staas & Halsey LLP (57) ABSTRACT

An object of the invention is to provide an optical amplification apparatus using Raman amplification, which can reliably judge an input interruption of signal light and can shut down the supply of excitation light in accordance with a judged input interruption of the signal light. To this end, the optical amplification apparatus of the present invention comprises an input interruption detection means for detecting a noise light component due to the Raman amplification, and judging an input interruption of the signal light based on the detection result, and further comprises a shut down control means for shutting down supply of the excitation light when an input interruption of the signal light is judged by the input interruption detection means. The input interruption detection means computes the noise light power due to the Raman amplification in accordance with monitored excitation light power, and corrects a threshold value as a judgment reference for an input interruption using the calculation result, and judges an input interruption of the signal light when a monitored value of the input light power to a second optical amplifying means is less than the post-correction threshold value.

2 Claims, 11 Drawing Sheets

OPTICAL AMPLIFICATION APPARATUS USING RAMAN AMPLIFICATION

CROSS-REFERENCE TO RELATED APPLICATIONS

This application is a continuation of 09/858,509 filed May 17, 2001, now U.S. Pat. No. 6,441,951, which is a continuation of International Application PCT/JP00/06102, filed Sep. 7, 2000, it being further noted that priority is based upon PCT Application No. PCT/JP00/06102, filed Sep. 7, 2000.

BACKGROUND OF THE INVENTION

1. Field of the Invention

The present invention relates to an optical amplification apparatus for amplifying signal light using Raman amplification, and in particular to an optical amplification apparatus having a function for detecting an input interruption of signal light.

2. Description of the Related Art

Figure 10:
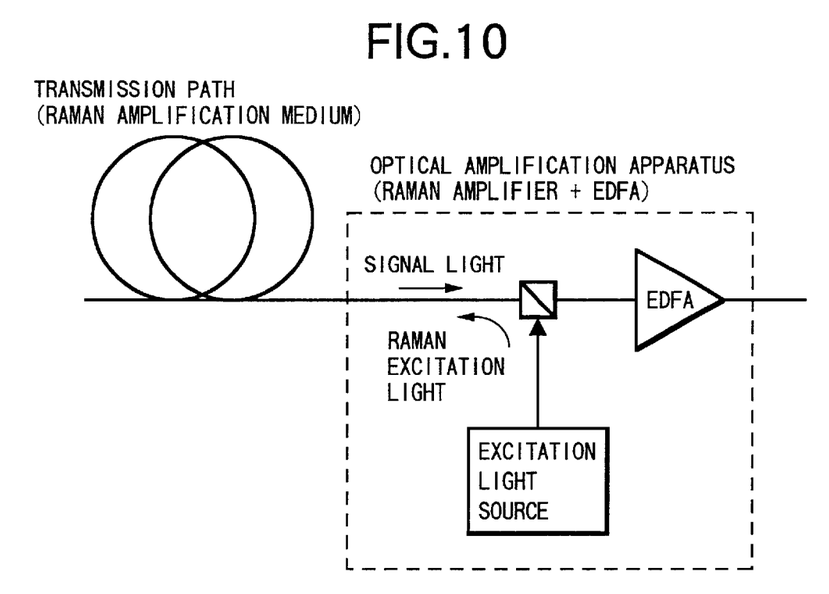
FIG. 10 is a block diagram showing a configuration of a conventional optical amplification apparatus where a Raman amplifier and an EDFA are combined.

Recently, the development of techniques has been progressed for achieving for example an expansion of optical amplification bands, or a reduction in repeater loss in various types of optical transmission systems, through the construction of optical amplification apparatus making use of Raman amplification. For example, an optical amplification apparatus is proposed with a construction as shown in FIG. 10, where a Raman amplifier is disposed prior to for example an erbium doped optical fiber amplifier (EDFA), and Raman amplified signal light is input to the EDFA. Furthermore, in the future, it may be considered that a Raman amplifier alone constructs the optical amplification apparatus.

However, with a general optical transmission system which repeatedly transmits signal light using an optical amplification apparatus, for example in the case where the signal light is cut off due to the occurrence of an open circuit of the transmission path or a disconnection of a connector, it is necessary to instantly detect the input interruption of the signal light in the optical amplification apparatus. The reason why such input interruption detection is necessary is to avoid for example; a problem where, since an AGC for controlling an amplification gain of signal light to be constant, or an ALC for controlling the level of output light to be constant, are generally applied to an optical amplification apparatus, in the case of an input interruption in the signal light, an amplification operation is controlled so as to obtain a predetermined output light by only a noise component which is generated in the optical amplification apparatus, or a problem where when the input interruption of the signal light is recovered in such a condition, in the case where an EDFA is used as the optical amplification apparatus, a surge is generated bringing damage to the apparatus.

Figure 11:
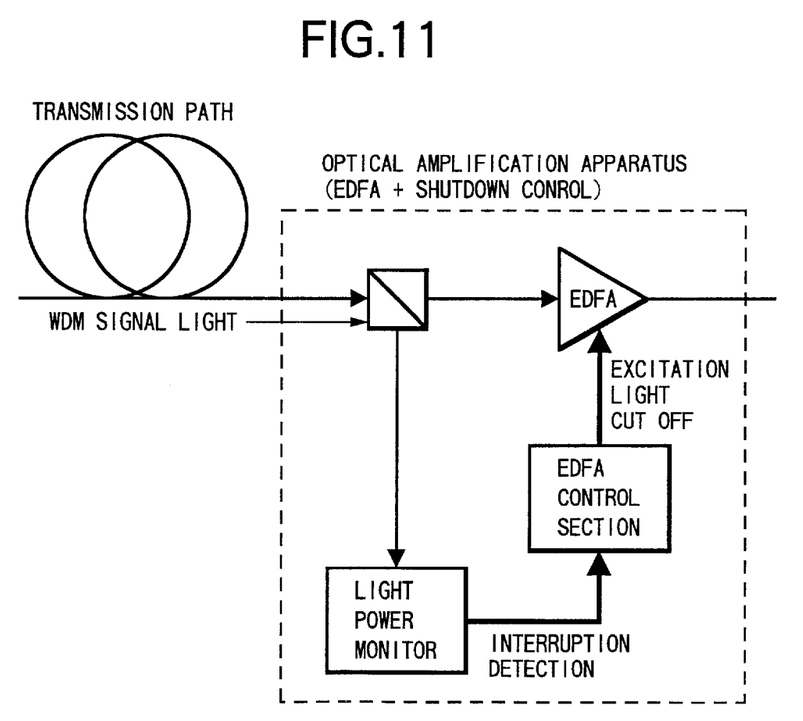
FIG. 11 is a block diagram showing a configuration of an EDFA in which a conventional shutdown control is performed.
Figure 12A:
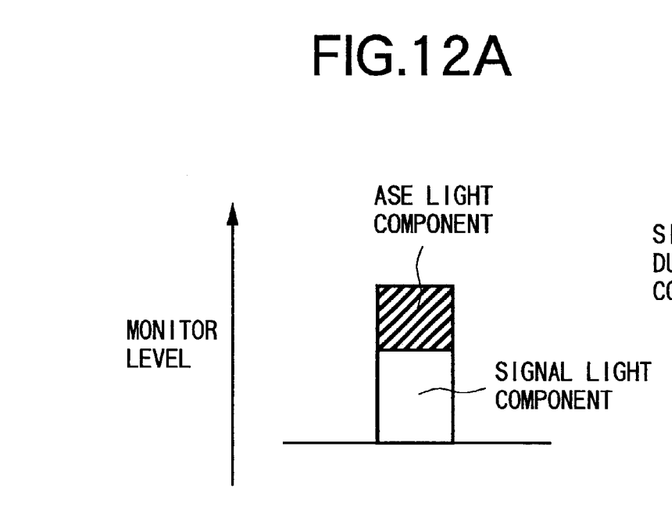
FIG. 12 is a diagram showing monitor level in a conventional shutdown control.

With the optical amplification apparatus using an EDFA, a so-called shutdown control has been performed which detects an input interruption of the signal light and shuts off supply of excitation light to the erbium doped fiber (EDF). More specifically, for example as shown in FIG. 11, when wavelength division multiplexed (WDM) signal light sent from a prior stage EDFA (not shown in the figure) via a transmission path is to be collectively amplified by an EDFA, a part of the WDM signal light input to the EDFA is branched by an optical coupler, and the power of the branched light is monitored by an light power monitor section. The light power monitored by the light power monitor section becomes, for example as shown in FIG. 12A, the light power corresponding to the sum of a signal light component contained in the WDM signal light and amplified spontaneous emission light (ASE light) which is generated and accumulated in the prior stage EDFA and so forth.

Figure 12B:
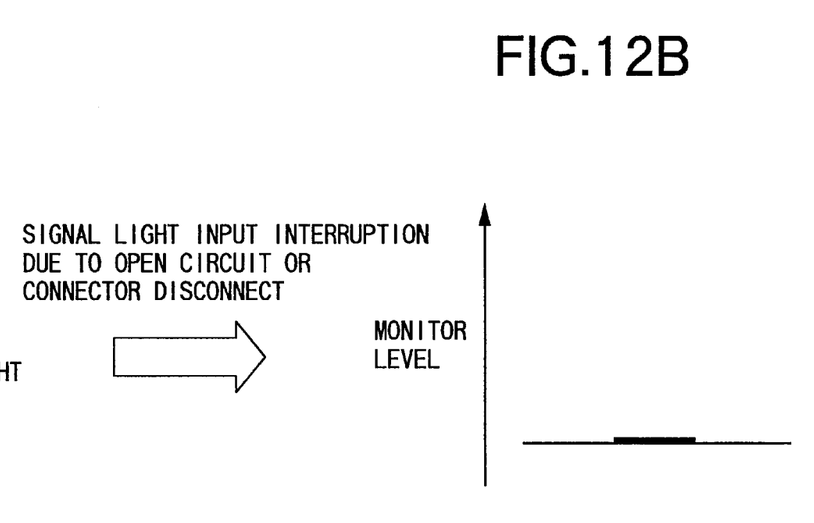

With such a construction, if an input interruption of the WDM signal light occurs due for example to an open circuit of the transmission path connected to the prior stage EDFA, a disconnection of a connector, or the like, then as shown in FIG. 12B, the light power monitored by the aforementioned light power monitor, becomes approximately zero. Consequently, with the shutdown control in the conventional EDFA, in the case where the light power monitored by the light power monitor section falls to a predetermined threshold value or below, the EDFA control section judges an input interruption of the WDM signal light to perform a control to shut down the supply of the excitation light to the EDFA.

In the case where the above described conventional EDFA shutdown control is applied to an optical amplification apparatus as shown in the aforementioned FIG. 10 where a Raman amplifier and an EDFA are combined, then caused by the generation of noise light due to Raman amplification, there is a problem that it is difficult to accurately judge an input interruption of the signal light. This noise light due to Raman amplification, is noise light which is also generated in the case where, in a situation where the signal light is not input, Raman excitation light only is emitted into an amplifying medium, and in general is referred to as Raman scattering light due to pumping light. Here, in contrast to the amplified spontaneous emission (ASE) light generated in the EDFA, the abovementioned noise light generated in the Raman amplifier is referred to as amplified spontaneous Raman scattering (ASS) light.

Figure 13A:
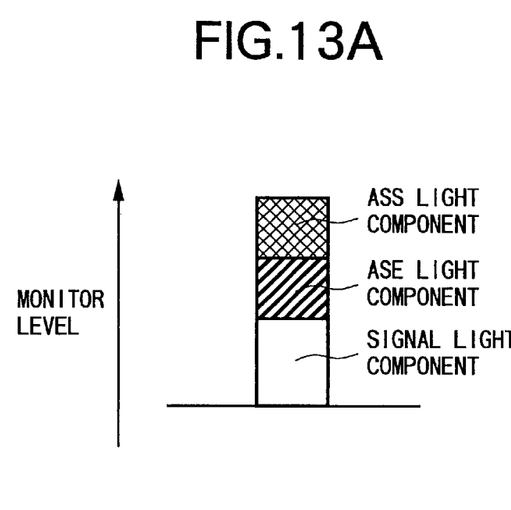
FIG. 13 is a diagram showing a monitor level for a case where a conventional shutdown control is applied to an optical amplification apparatus where a Raman amplifier and an EDFA are combined.
Figure 13B:
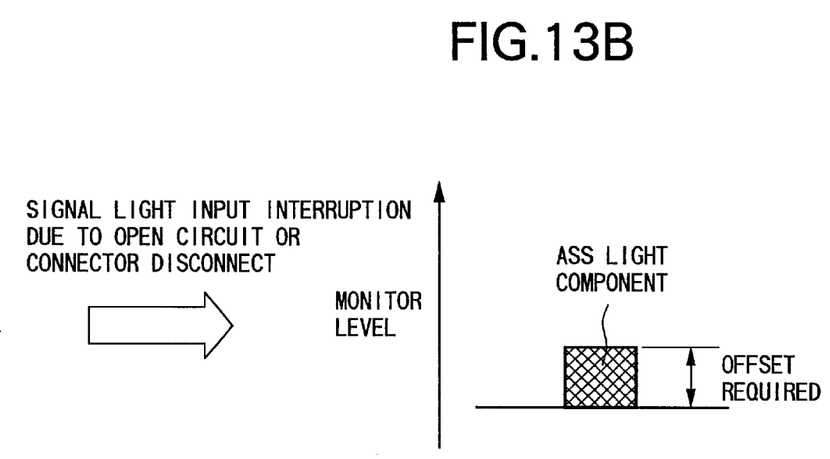

In an optical amplification apparatus where a Raman amplifier and an EDFA are combined, the power of the input light to the EDFA, to be monitored by the light power monitor is, for example as shown in FIG. 13A, specifically the light power corresponding to the sum of the signal light component, the ASE light component which is generated and accumulated in the prior stage EDFA and the like, and the ASS light component generated due to Raman amplification of the own stage Raman amplifier. Then, when an input interruption of the signal light occurs, the light power monitored by the aforementioned light power monitor, becomes as shown in FIG. 13B, the light power corresponding to the ASS light component. Consequently, in order to perform a positive shutdown control for such an optical amplification apparatus unit, it becomes a subject to perform the correction in accordance with the aforementioned ASS light component, for the threshold value being the reference for judging an input interruption in the shutdown control in the conventional EDFA.

Furthermore, with the optical amplification apparatus which uses Raman amplification, since extremely high level excitation light is emitted into the optical fiber which constitutes the transmission path, there is the possibility that due to an open circuit of the transmission path or a disconnection of the connector, the excitation light may be emitted to the outside. In such a case, it is desirable to take measures such as, immediately lowering the excitation light power to a safe level, or switching off the drive condition of the excitation light source. However, to optical amplification apparatuses using Raman amplification, which have been proposed up to this date, the abovementioned measures have not been specifically applied.

The present invention addresses the above mentioned points, with the object of providing an optical amplification apparatus which uses Raman amplification and which can reliably judge an input interruption of signal light, and providing an optical amplification apparatus which can shut down the supply of excitation light in accordance with a judged input interruption of the signal light.

SUMMARY OF THE INVENTION

Therefore, an optical amplification apparatus of the present invention provided with first optical amplifying means for Raman amplifying signal light propagated through a Raman amplification medium by supplying excitation light to the Raman amplification medium, comprises input interruption detection means for detecting a noise light component due to the first optical amplifying means, and judging an input interruption of the signal light using the detection result. With such a construction, an input interruption detection of the signal light is performed taking into consideration an influence of amplified spontaneous Raman scattering light.

Furthermore, the construction may be such that the above-mentioned optical amplification apparatus may comprise shutdown control means for shutting down supply of the excitation light when an input interruption of the signal light is judged by the input interruption detection means. With such a construction, when the input of signal light to the optical amplification apparatus is interrupted, supply of Raman excitation light is automatically shut down by the shut down control means, thus such a situation where high level excitation light is emitted to the outside can be avoided.

Furthermore, the construction may be such that the above-mentioned optical amplification apparatus may comprise a second optical amplifying means for amplifying the signal light output from the first optical amplifying means. As a result, also in an optical amplification apparatus having a construction where the first and second optical amplifying means are combined, the reliable input interruption detection and shutdown control can be performed.

As a specific construction for the aforementioned optical amplification apparatus, the input interruption detection means includes an excitation light power detection section for detecting the excitation light power supplied to the Raman amplification medium, an input light power detection section for detecting the input light power to the second optical amplifying means, and a computation section for computing the noise light power due to the first optical amplifying means in accordance with the detection result of the excitation light power detection section, and performing correction of a relative level of a threshold value as a judgment reference for an input interruption and the input light power detected by the input light power detection section, in accordance with the computed noise light power, and judging an input interruption of the signal light when the input light power to the second optical amplifying means is less than the threshold value, and the shut down control means shuts down the supply of excitation light at least to the Raman amplification medium when an input interruption of the signal light is judged by the input interruption detection means. Furthermore, the shut down control means may also stop an optical amplifying operation of the second optical amplifying means when an input interruption of the signal light is judged by the input interruption detection means.

With such a construction, the power of the Raman excitation light is detected by the excitation light power detection section, and the input light power of the second optical amplifying means is detected by the input light power detection section, and each of the detection results are sent to the computation section. In the computation section, the noise light power due to Raman amplification is computed in accordance with the Raman excitation light power detected by the excitation light power detection section, and the correction processing of the threshold value as the judgment reference for an input interruption is performed, or correction (offset processing) of the input light power detected by the input light power detection section is performed, in accordance with the computation result. Then, when the input light power to the second optical amplifying means is less than the threshold value, an input interruption of the signal light is judged, and the shutdown control is performed by the shut down control means, for shutting off the supply of excitation light to the Raman amplification medium, and stopping the optical amplifying operation of the second optical amplifying means.

Furthermore, as another aspect of the optical amplification apparatus of the present invention, in an optical amplification apparatus provided with a first optical amplifying means for Raman amplifying signal light propagated through a Raman amplification medium which is connected thereto via a connector, by supplying excitation light to the Raman amplification medium, the first optical amplifying means comprises: a transmission excitation light power detection section for detecting the power of excitation light supplied to the Raman amplification medium, a reflection excitation light power detection section for detecting the power of reflection light generated as a result that the excitation light supplied to the Raman amplification medium is reflected by an end face of the connector, and a safety light control section for judging, based on each detection result from the transmission excitation light power detection section and the reflection excitation light power detection section, if the connector is normally connected, and when the connector is normally connected, setting the excitation light power to a predetermined level to enable Raman amplification, and when the connector is not normally connected, reducing the excitation light power to a safe level.

With such a construction, each power of the transmission light and the reflection light in the excitation light supplied to the Raman amplification medium via the connector, is respectively detected by the transmission excitation light power detection section and the reflection excitation light power detection section, and based on the detection results, the connection condition of the connector is judged by the safety light control section, thereby performing a so-called laser-safe light control for the Raman excitation light.

DETAILED DESCRIPTION OF THE PREFERRED EMBODIMENTS

Hereunder is a description of embodiments of an optical amplification apparatus using Raman amplification according to the present invention, with reference to the appended drawings.

Figure 1:
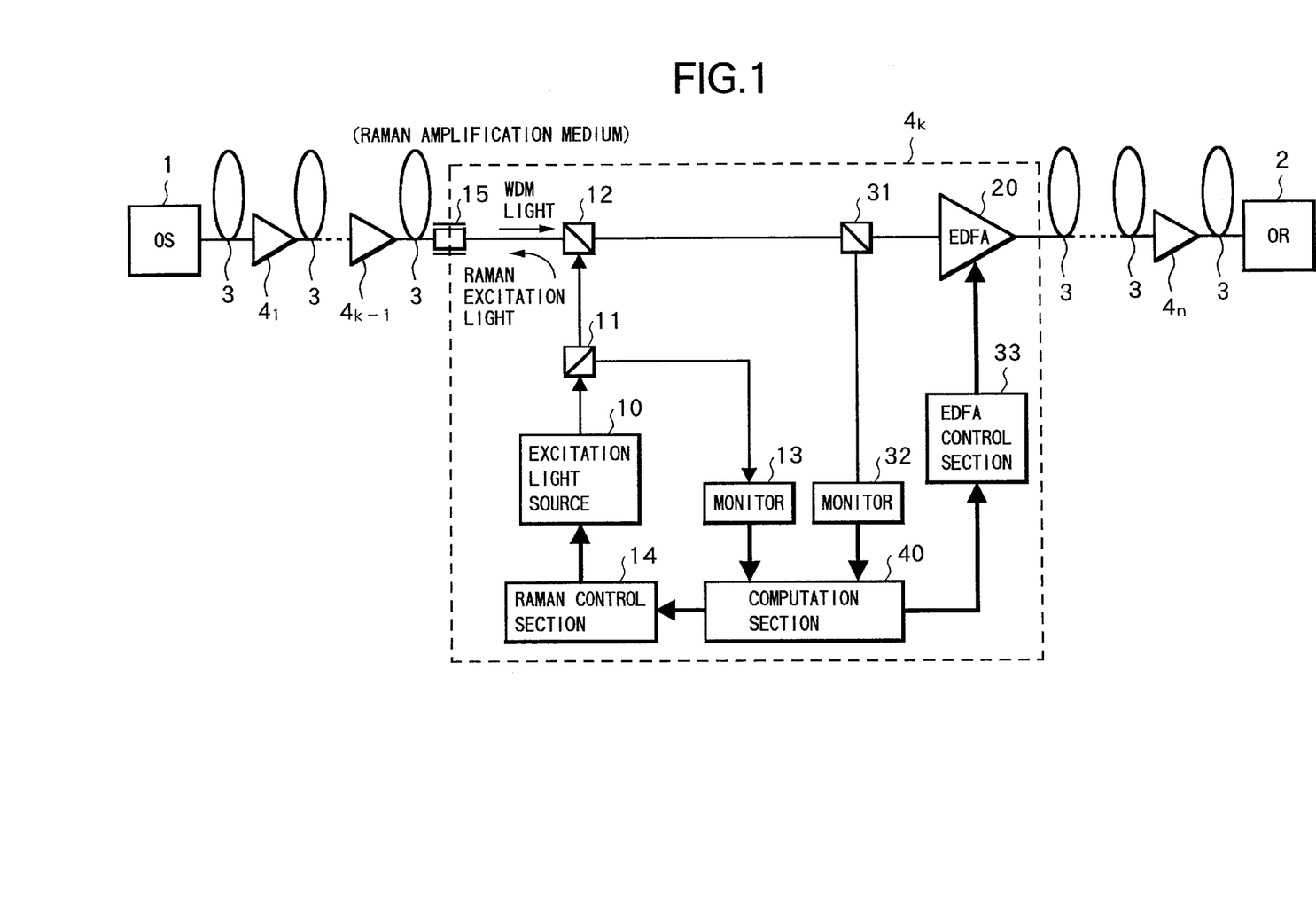
FIG. 1 is a block diagram showing the configuration of an essential part of a WDM optical communication system using an optical amplification apparatus according to a first embodiment of the present invention.

FIG. 1 is a block diagram showing the configuration of an essential part of a WDM optical communication system which uses an optical amplification apparatus according to a first embodiment of the present invention.

In FIG. 1, with the WDM optical communication system which uses the present optical amplification apparatus, a transmission path 3 connects between an optical sender (OS) 1 and an optical receiver (OR) 2, and on the transmission path 3 there are arranged n optical repeaters $4_1, \ldots, 4_{k-1}, 4_k$, . . . $4_n$ at required intervals, and WDM signal light is repeatedly transmitted from the optical sender 1 to the optical receiver 2. Each of the optical repeaters $4_1$ through $4_n$ is respectively provided with an optical amplification apparatus to which the present invention is applied, and the optical amplification apparatus has a basic construction with a Raman amplifier (first optical amplifying means) and for example an EDFA (second optical amplifying means) as a rare earth element doped optical fiber amplifier, combined together. In FIG. 1, a specific construction is shown for the optical amplification apparatus inside the k-th optical repeater $4_k$. The constructions of the optical amplification apparatuses inside the optical repeaters other than the k-th one are the same.

The optical sender 1 is a general optical sender which generates WDM signal light obtained by multiplexing a plurality of optical signals of different wavelengths, and sends this to the transmission path 3. The optical receiver 2 is a general optical receiver which receives the WDM signal light transmitted from the optical sender 1 via the transmission path 3 and the optical repeaters $4_1$ to $4_n$, and performs a reception processing to demultiplex this into optical signals of respective wavelength.

The transmission path 3 connects between the optical sender 1, each of the optical repeaters $4_1$ through $4_n$, and the optical receiver 2, to propagate the WDM signal light. Furthermore, Raman excitation light output from a signal light input end of an optical repeater positioned on the reception side is supplied to the transmission path 3 of each repeating segment, so that the transmission path 3 of each segment functions as a Raman amplification medium.

The optical amplification apparatus of each optical repeater $4_1$ through $4_n$, has for example as the constituent elements on the Raman amplifier side, an excitation light source 10, optical couplers 11 and 12, a monitor 13, a Raman control section 14, and a connector 15, while for the constituent elements on the EDFA side, having an EDFA 20, an optical coupler 31, a monitor 32, and an EDFA control section 33. Furthermore, the optical amplification apparatus has a computation section 40 for judging an input interruption of signal light based on monitor results in the respective monitors 13 and 32, and sending commands to the Raman control section 14 and the EDFA control section 33. Here, the Raman control section 14 and the EDFA control section 33 correspond to a shut down control means.

The excitation light source 10 generates excitation light (referred to hereunder as Raman excitation light) for Raman amplification having a wavelength previously set corresponding to the wavelength band of the WDM signal light to be transmitted, and the Raman excitation light is supplied to the transmission path 3 via the optical couplers 11 and 12, and the connector 15. The optical coupler 11 is for branching a part of the Raman excitation light output from the excitation light source 10 to transmit this to the monitor 13. The optical coupler 12 is for supplying the Raman excitation light which has passed through the optical coupler 11 to the transmission path 3 via the connector 15 provided at the signal light input end, and also passes the WDM signal light from the transmission path 3 to transmit this to the EDFA 20 side. Here, the Raman excitation light is propagated in the opposite direction to the WDM signal light, with the transmission path 3 connected to the connector 15 becoming a Raman amplification medium, so that the WDM signal light propagated through the transmission path 3 is Raman amplified, thus constructing a so-called distributed Raman amplifier (DRA).

The monitor 13 monitors the power of the Raman excitation light output from the excitation light source 10 based on the branched light of the optical coupler 11, and outputs the monitor result to the computation section 40. The Raman control section 14 is for controlling a drive condition of the excitation light source 10 in accordance with a command output from the computation section 40.

Figure 2:
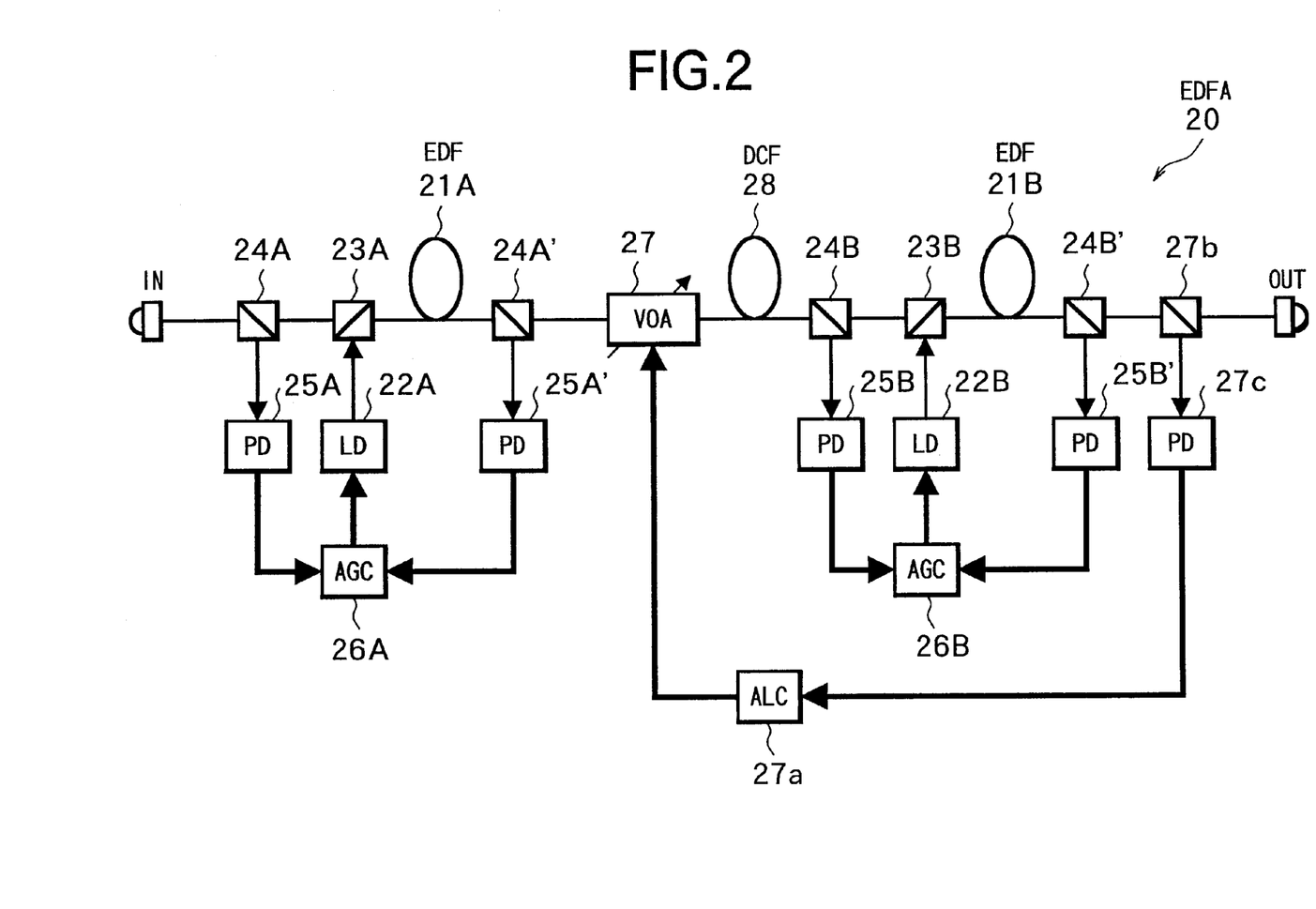
FIG. 2 is a block diagram showing an example of a specific configuration of an EDFA in the first embodiment of the present invention.

The EDFA 20 is an EDFA of a general construction for amplifying WDM signal light which has passed through the optical couplers 12 and 31 to a required level. FIG. 2 is a block diagram showing an example of a specific construction of the EDFA 20.

The EDFA 20 shown in the configuration example of FIG. 2 is constructed such that two optical amplifying sections using erbium doped fibers (EDF) are connected in series, and a variable optical attenuator (VOA) 27 and a dispersion compensation fiber (DCF) 28 are respectively inserted between a prior stage optical amplifying section and a succeeding stage optical amplifying section.

The prior stage optical amplifying section has an EDF 21A, an excitation light source (LD) 22A, optical couplers 23A, 24A, 24A', photodetectors (PD) 25A, 25A', and an AGC circuit 26A. The EDF 21A is input with WDM signal light which has passed through an input terminal IN and the optical couplers 24A and 23A. This EDF 21A is supplied with excitation light from the excitation light source 22A via the optical coupler 23A to become an excited condition. The wavelength band of the excitation light generated by the excitation light source 22A is set for example at the 980 nm band or the 1480 nm band for WDM signal light of the 1550 nm band. The drive condition of this excitation light source 22A is controlled by the AGC circuit 26A. The input light power to the prior stage optical amplifying section to be detected by the optical coupler 24A and the photodetector 25A, and the output light power from the prior stage optical amplifying section to be detected by the optical coupler 24A' and the photodetector 25A', are transferred to the AGC circuit 26A where at the time of normal operation, the excitation light power generated by the excitation light source 22A is automatically controlled so that a gain of the prior stage optical amplifier becomes constant.

The succeeding stage optical amplifying section has an EDF 21B, an excitation light source (LD) 22B, optical couplers 23B, 24B and 24B', photodetectors (PD) 25B, 25B', and an AGC circuit 26B. Each part of these is the same as the parts corresponding to the prior stage optical amplifying section.

The variable optical attenuator 27 attenuates the WDM signal light output from the prior stage optical amplifying section and outputs this to the dispersion compensation fiber 28. The light attenuation of the variable optical attenuator 27 is controlled by an ALC circuit 27a. The output light power from the succeeding stage light optical amplifying section which is detected by an optical coupler 27b and a photodetector 27c, is transferred to the ALC circuit 27a where at the time of normal operation, the light attenuation of the variable light attenuator 27 is automatically controlled so that the total output light power from the EDFA 20 becomes constant in accordance with a set level. The dispersion compensation fiber 28 compensates for wavelength dispersion characteristics of the transmission path 3 which connects between the optical repeaters.

The optical coupler 31 (FIG. 1) branches a part of the WDM signal light input to the above described EDFA 20, and transmits the branched light to the monitor 32. The monitor 32 monitors the input light power of the EDFA 20 based on the branched light from the optical coupler 31, and outputs the monitor result to the computation section 40.

The computation section 40 computes the total power of the amplified spontaneous Raman scattering light (ASS light) which becomes the noise component due to Raman amplification, based on the Raman excitation light power from the monitor 13. Then, the computation section 40 performs a correction processing for increasing for example, a previously set threshold value for judging an input interruption of signal light, in accordance with the computed total power value of the ASS light, or performs an offset processing for slightly correcting the input light power of the EDFA 20 monitored by the monitor 32, in accordance with the computed total power value of the ASS light. Next, the computation section 40 compares the input light power of the EDFA 20 with the threshold value, and when the input light power is smaller than the threshold value, judges an input interruption of the signal light, and sends commands for performing shutdown control to the Raman control section 14 and the EDFA control section 33, respectively.

Next is a description of the operation of the first embodiment.

At first the computation processing performed by the computation section 40 of the present optical amplification apparatus will be specifically described.

Figure 3:
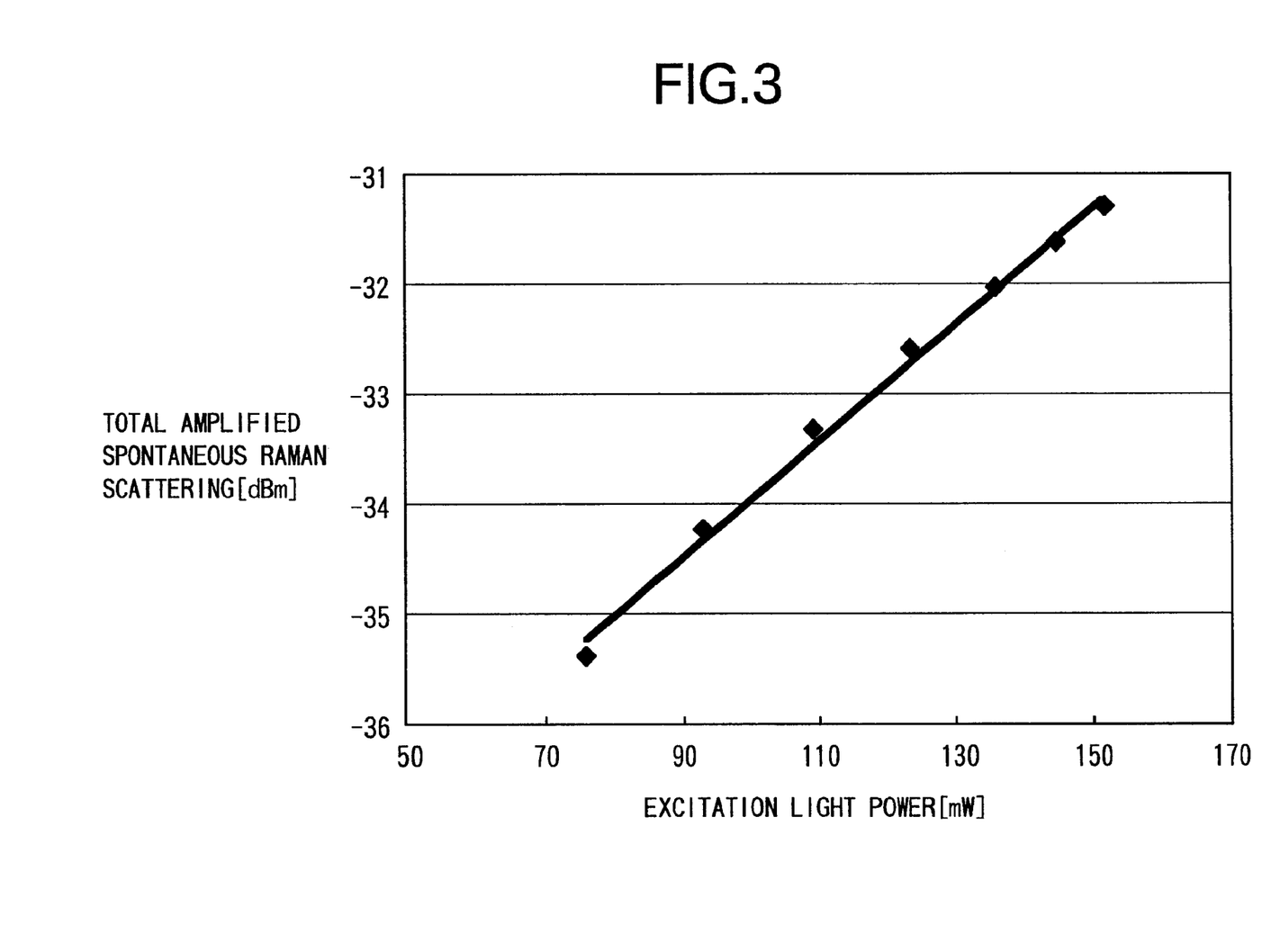
FIG. 3 is a diagram showing a relationship between total power of a noise component (ASS light) generated by Raman amplification, and power of Raman excitation light.

The computation section 40, as mentioned before, computes the total power of the ASS light based on the power of the Raman excitation light. It has been experimentally confirmed that the total power of the ASS light (noise component) generated by Raman amplification changes in accordance with the relationship shown for example in FIG. 3. If this relationship is numerically expressed with antilog values, the total power Ass (mW) of the ASS light can be expressed by the following equation (1).

$$Ass = m_1 \cdot 10^{\frac{a_{11} \cdot Pu_1 + a_{10}}{10}} + m_2 \cdot 10^{\frac{a_{21} \cdot Pu_2 + a_{20}}{10}} + \ldots + m_i \cdot 10^{\frac{a_{i1} \cdot Pu_i + a_{i0}}{10}} \quad (1)$$

wherein $Pu_1$ to $Pu_i$ is the Raman excitation light power (mW) generated by each excitation light source, in the case where i Raman excitation light sources with different wavelengths are provided (in this embodiment i=1), $m_1$ to $m_i$ are the weighting constants corresponding to each excitation light source, and $a_{11}$, $a_{10}$ to $a_{i1}$, $a_{i0}$ are constants for when the relationship shown in FIG. 3 is approximated by a linear function. Here, the relationship of the total power of the ASS light to the power of the Raman excitation light is approximated by a linear function, however it is also possible to increase the accuracy by approximating the relationship with a quadratic or higher function.

Once the total power Ass of the ASS light has been computed in accordance with the relationship of the above-mentioned equation (1), using the Raman excitation light power measured by the monitor 13, then next the threshold value for judging an input interruption of the signal light is subjected to correction processing, or the input light power of the EDFA 20 transferred from the monitor 32 is subjected to offset processing.

Figure 4:
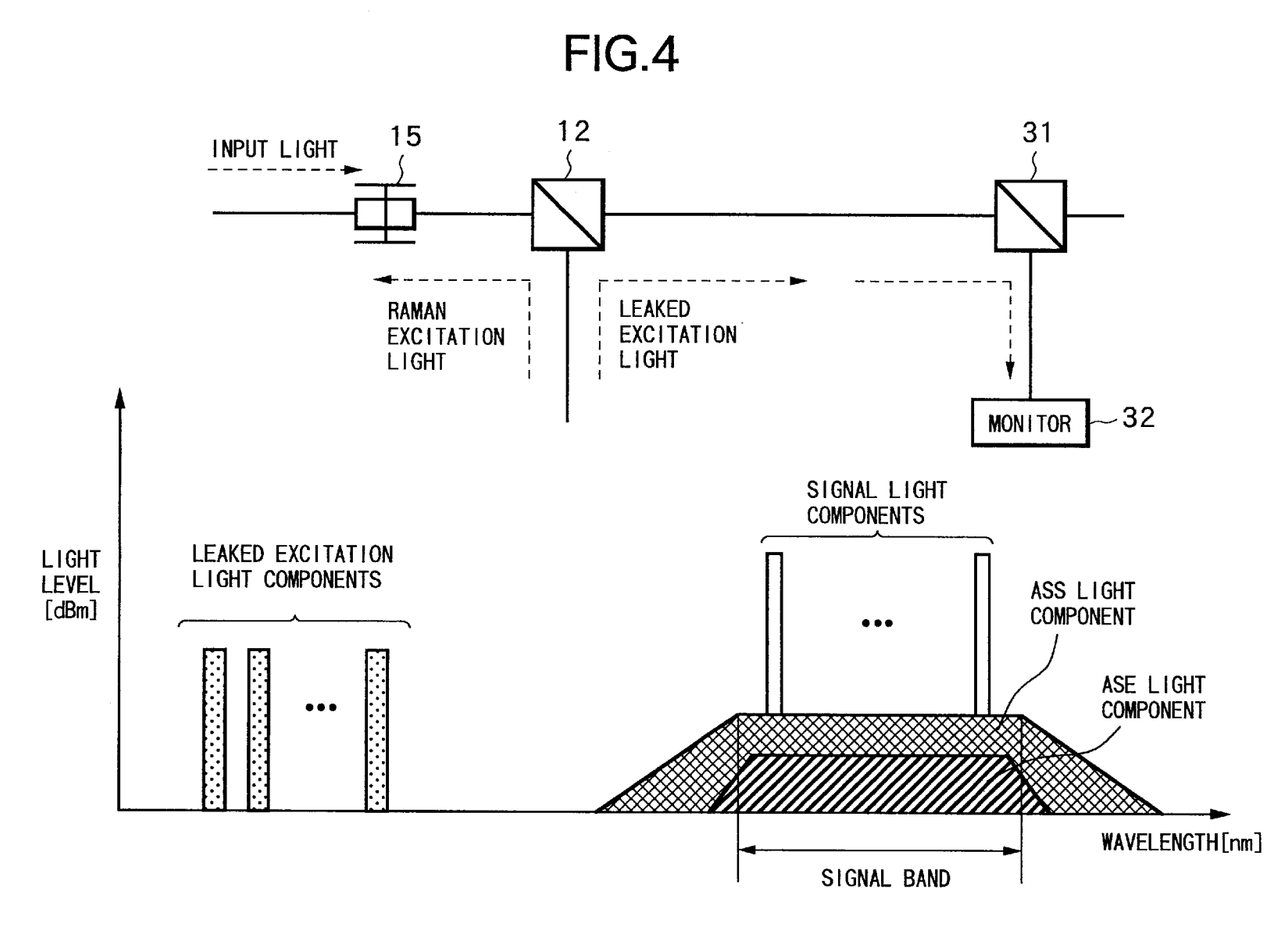
FIG. 4 is a diagram showing a power level of light branched by an optical coupler at an EDFA input stage with respect to wavelength, in the first embodiment of the present invention.

Here, the input light of the EDFA 20 which is branched by the optical coupler 31 and monitored by the monitor 32 will be specifically described. FIG. 4 is a diagram showing the power level of the light branched by the optical coupler 31 with respect to wavelength.

As shown in FIG. 4, regarding the branched light of the optical coupler 31, in the signal band of the WDM signal light and the vicinity thereof, there exists an ASE light component which has been generated and accumulated in the prior stage EDFA and so forth, an ASS light component which has been generated in the own stage Raman amplification, and signal light component. Furthermore, a leaked excitation light component which have leaked for example due to Rayleigh scattering, Fresnel reflection or the like, exists in a wavelength region away from the signal band. The total power of such light, as shown in (A) of FIG. 5, is obtained by adding the aforementioned signal light component, the accumulated ASE light component, the ASS light component, and the leaked excitation light component, respectively.

The leaked excitation light component outside of the signal band is not monitored by the monitor 32, by transmitting the light which is branched by the optical coupler 31 to be sent to the monitor 32, through an optical filter or the like, to shut off the component outside of the signal band or the component outside of the gain band of Raman amplification. In this way, the total power which is monitored by the monitor 32, as shown in (B) of FIG. 5, is the addition result of the signal light component, the accumulated ASE light component and the ASS light component.

Figure 5:
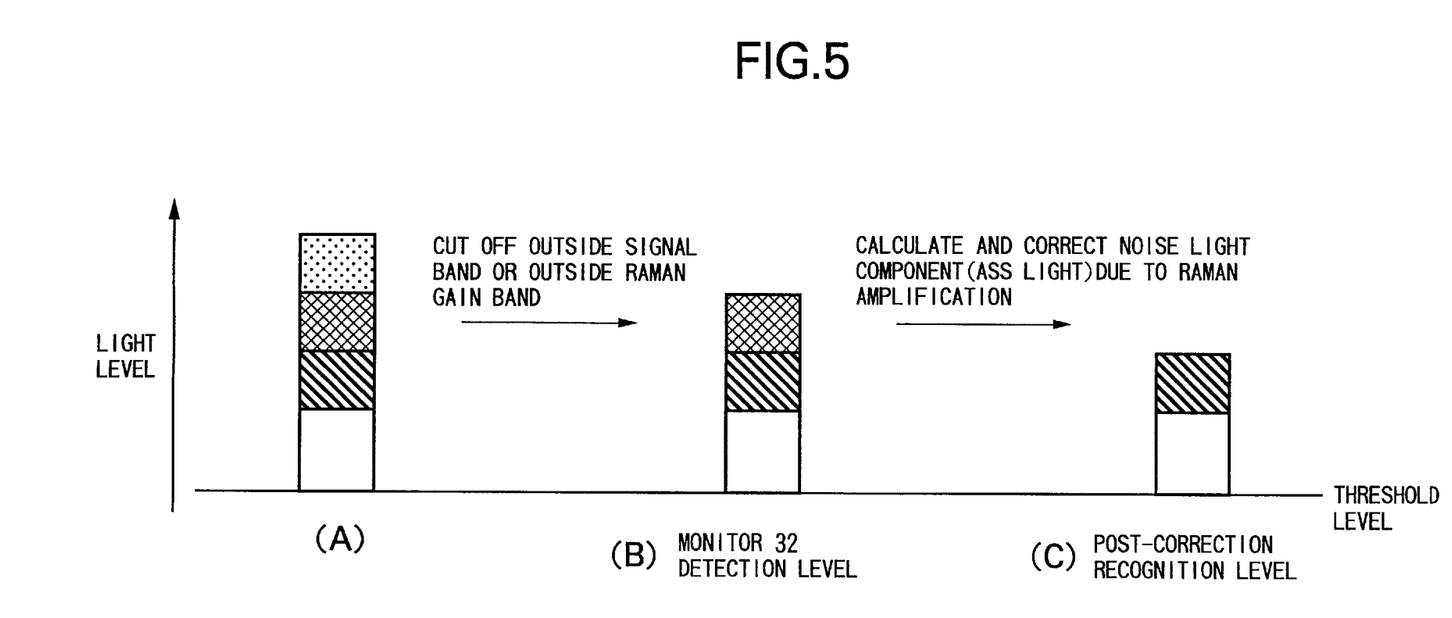
FIG. 5 is a diagram for explaining the computation processing in a computation section in the first embodiment of the present invention.

By performing correction (offset processing) of the level corresponding to the ASS light component in accordance with a value of the Ass computed by the aforementioned equation (1), with respect to such a monitor result of the monitor 32, the post-correction total power, as shown in (C) of FIG. 5, becomes the addition result of the signal light component and the accumulated ASE light component. This post-correction monitor level becomes the same as the input light power of the EDFA which has been monitored for judging an input interruption of the signal light, in the conventional EDFA before the application of the Raman amplifier (refer to FIG. 12A).

Consequently, by performing a comparison of the monitor level of the monitor 32 after the ASS light component has been corrected, with the previously set threshold value, an input interruption of the signal light can be accurately judged in a similar manner to with the conventional case. More specifically, in the case where in the computation section 40 the post-correction monitor level of the monitor 32 becomes less than the threshold value, an input interruption of the signal light is judged.

When an input interruption of the signal light is judged in the computation section 40, then here, a command for stopping drive of the Raman excitation light source 10 to shut down the supply of Raman excitation light to the transmission path 3 is sent from the computation section 40 to the Raman control section 14, and a command for stopping drive of the excitation light source inside the EDFA 20 to shut down the supply of excitation light to the EDF is sent from the computation section 40 to the EDFA control section 33.

In this way, with this optical amplifier of the first embodiment, it becomes possible to immediately and reliably detect an input interruption of the signal light in consideration of the influence of ASS light. Furthermore, when an input interruption of the signal light is detected, the Raman excitation light supplied to the transmission path 3 is shut down. Therefore, even if for example an open circuit of the transmission path or a disconnection of the connector or the like occurs, a situation where high level excitation light is emitted to the outside can be avoided. Furthermore, if the operation of the EDFA 20 is also stopped with the input interruption of the signal light, an even safety can be ensured since the excitation light of the EDF can be shut down. Hence, it becomes possible to also prevent the aforementioned damage to the apparatus due to surge.

Next is a description of a second embodiment of the present invention.

Figure 6:
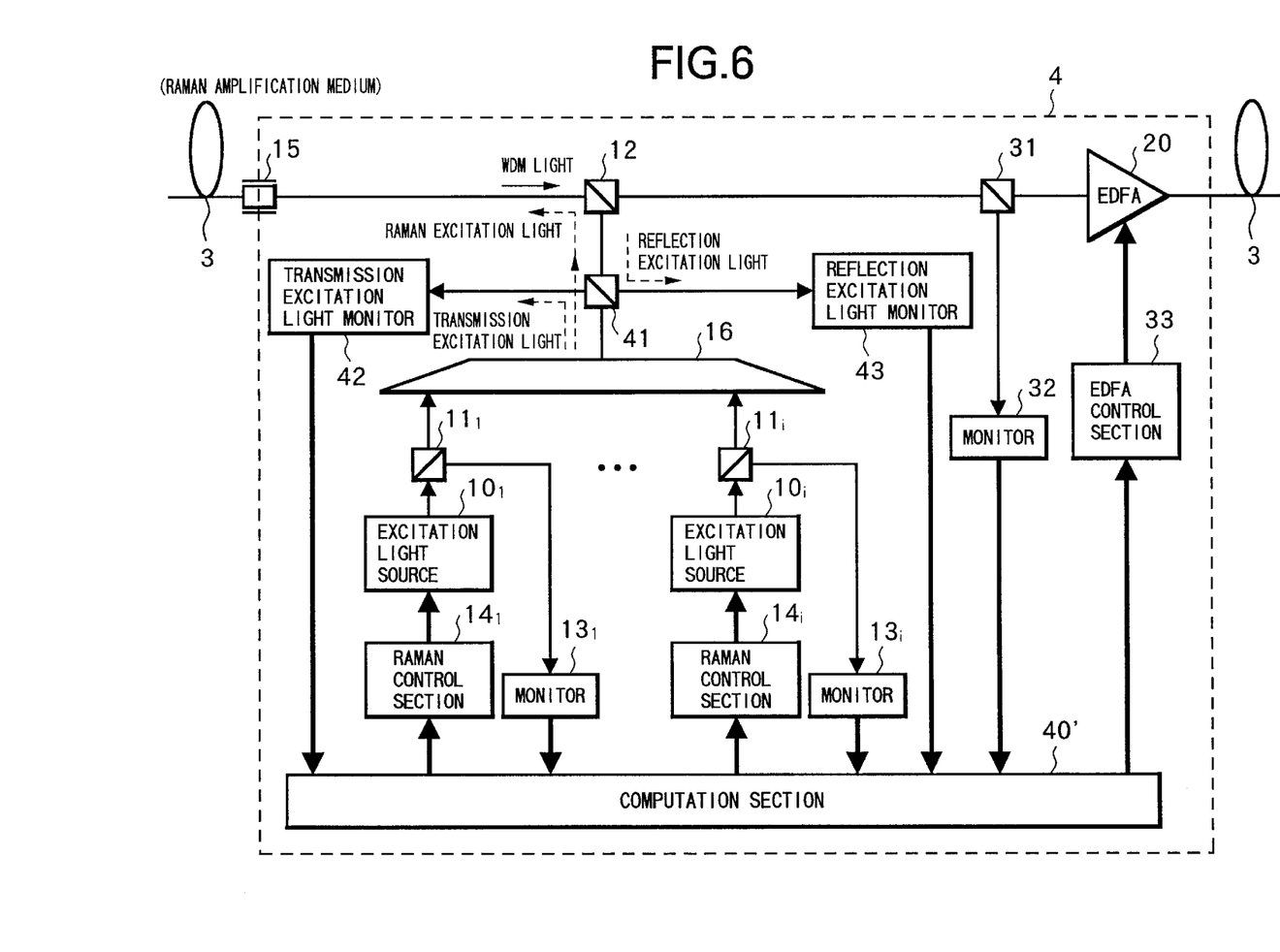
FIG. 6 is a block diagram showing a configuration of an optical amplification apparatus according to a second embodiment of the present invention.

FIG. 6 is a block diagram showing a configuration of an optical amplification apparatus according to the second embodiment. Here, parts of the same construction as those of the optical amplification apparatus according to the first embodiment are denoted by the same symbols. The same applies hereunder.

In FIG. 6, the points where the configuration of this optical amplification apparatus 4 is different from the configuration of the first embodiment shown in FIG. 1 are: the point that a plurality (i in the figure) of Raman excitation light sources $10_1$ to $10_i$ with different wavelengths are provided, and each of the Raman excitation lights generated by each of the Raman excitation light sources $10_1$ to $10_i$ is multiplexed by a WDM coupler 16 and then supplied via optical couplers 41 and 12 to the transmission path 3, and a part of each of the Raman excitation lights generated by each of the Raman excitation light sources $10_1$ to $10_i$ is branched by optical couplers $11_1$ to $11_i$ and monitored by monitors $13_1$ to $13_i$ and the respective monitored results are then sent to a computation section 40'; and the point that the optical coupler 41, a transmission excitation light monitor 42, and a reflection excitation light monitor 43 are provided for monitoring a connection condition of the connector 15 on the signal light input end, to thereby perform a laser-safe light control of the Raman excitation light. The configuration of the parts other than the above mentioned parts are the same as for the case of the first embodiment.

The computation section 40' computes the total power Ass of the ASS light in accordance with the relation of the above mentioned equation (1) using the Raman excitation light power of each wavelength monitored by each of the monitors $13_1$ to $13_i$ respectively corresponding to the Raman excitation light sources $10_1$ to $10_i$, and as with the case of the first embodiment, performs an offset processing etc. of the input light power to the EDFA 20 obtained by the monitor 32, and judges an input interruption of the signal light. Furthermore, the computation section 40' also incorporates a function for judging the connection condition of the connector 15 based on each of the monitor results of the transmission excitation light monitor 42 and the reflection excitation light monitor 43 to thereby perform a laser-safe light control for the Raman excitation light.

The transmission excitation light monitor 42 measures the power of the Raman excitation light supplied via the optical coupler 12 to the transmission path (Raman amplification medium) 3, by branching at the optical coupler 41 a part of the Raman excitation light which has been multiplexed by the WDM coupler 16, and monitoring the power of the branched light, and transmits the measurement result to the computation section 40'.

The reflection excitation light monitor 43 monitors the reflection light power of the Raman excitation light supplied to the transmission path 3 and transmits the monitor result to the computation section 40'. This reflection light is mainly the light generated as a result that the Raman excitation light which has been multiplexed in the WDM coupler 16 is reflected by the end face of the connector 15. A part of this reflection light is branched by the optical coupler 41 and sent to the reflection excitation light monitor 43.

The computation section 40' which receives the respective monitor results of the transmission excitation light monitor 42 and the reflection excitation light monitor 43, computes a proportion of the reflection excitation light power with respect to the transmission excitation light power, and in the case where this proportion exceeds a predetermined value, judges a connection fault of the connector 15. If a connection fault of the connector 15 is judged, a command to lower the power of the Raman excitation light output from each of the Raman excitation light sources $10_1$ to $10_i$ is respectively sent from the computation section 40' to each of the Raman control sections $14_1$ to $14_i$ so that the drive condition of each of the Raman excitation light sources $10_1$ to $10_i$ is automatically controlled. Furthermore, when the connection of the connector 15 is restored to the normal condition and then the proportion of the reflection excitation light power with respect to the transmission excitation light power goes below the predetermined value, a command to restore the Raman excitation light power for each wavelength to a predetermined level is respectively sent from the computation section 40' to each of the Raman control sections $14_1$ to $14_i$, and the supply of excitation light to the Raman amplification medium is resumed.

In this manner, with the optical amplification apparatus of the second embodiment, even in a configuration where a plurality of Raman excitation light sources $10_1$ to $10_i$ of different wavelengths are combined together to generate Raman excitation light, by monitoring the power of the Raman excitation light of each wavelength, the noise component due to Raman amplification can be computed using the aforementioned equation (1). Therefore a similar effect to the case of the first embodiment can be obtained. Furthermore, by providing the transmission excitation light monitor 42 and the reflection excitation light monitor 43 for the Raman excitation light, so-called laser-safe light control is performed corresponding to the connection condition of the connector 15, and hence an optical amplification apparatus where safety is further enhanced can be realized.

Next is a description of a third embodiment of the present invention. With the third embodiment, consideration is given to an optical amplification apparatus suitable for a WDM optical communication system where for example WDM signal light of a so-called C band with the wavelength band of 1550 nm band, and WDM signal light of a so-called L band with the wavelength band of 1580 nm band, are collectively transmitted.

Figure 7:
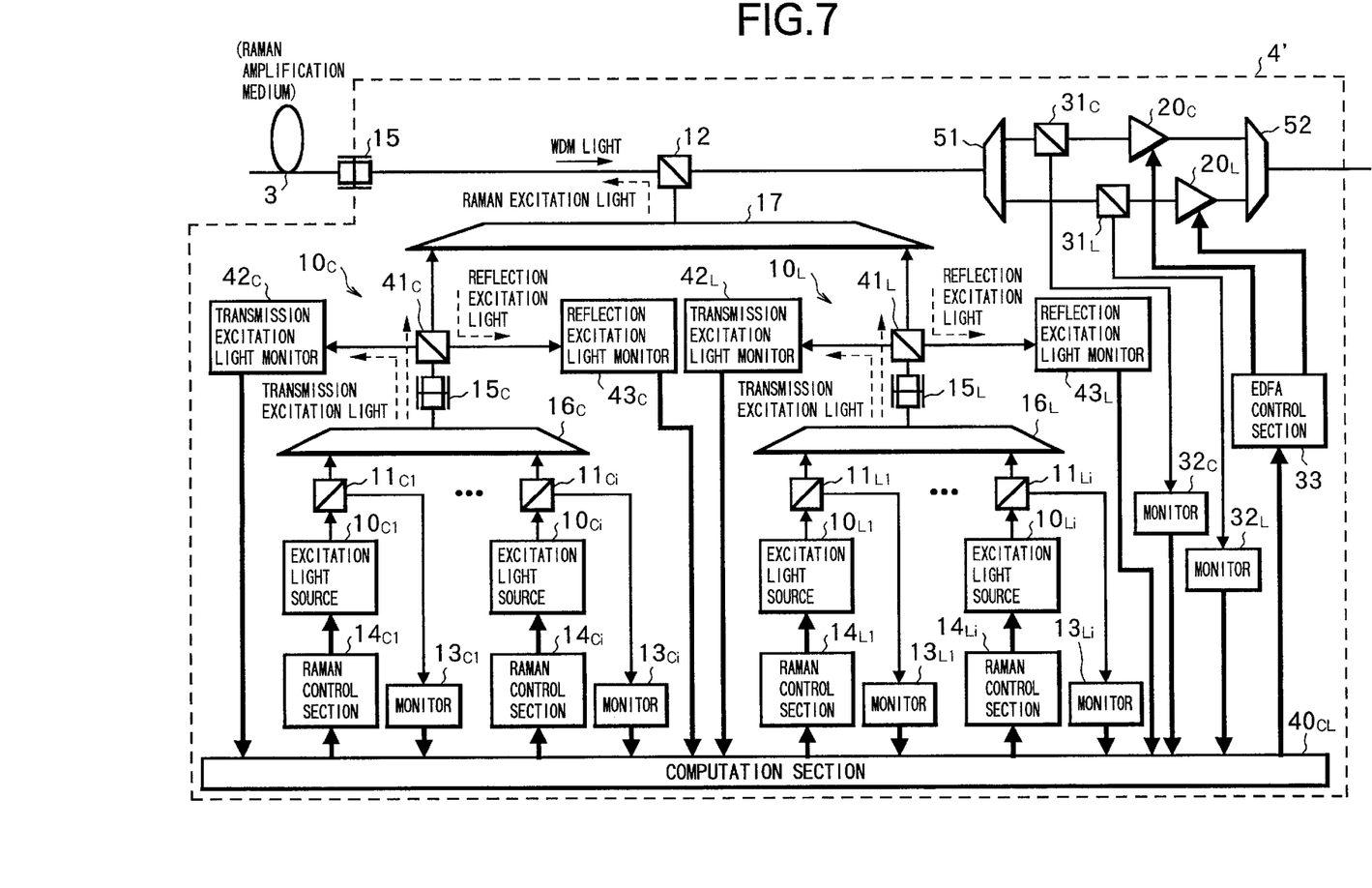
FIG. 7 is a block diagram showing a configuration of an optical amplification apparatus according to a third embodiment of the present invention.

FIG. 7 is a block diagram showing a configuration of an optical amplification apparatus according to the third embodiment.

In FIG. 7, this optical amplification apparatus 4' has a unit 10$_C$ corresponding to the C band and a unit 10$_L$ corresponding to the L band, into which are separated the plurality of Raman excitation light sources of different wavelengths in the optical amplification apparatus 4 of the aforementioned second embodiment shown in FIG. 6, and a WDM coupler 17 for multiplexing the Raman excitation lights respectively output from the C band Raman excitation light unit 10$_C$ and the L band Raman excitation light unit 10$^L$ to send the multiplexed light to the optical coupler 12. The C band Raman excitation light unit 10$_C$ and the L band Raman excitation light unit 10$_L$ are each of a similar configuration on the Raman amplifier side of the second embodiment, and in FIG. 7, the respective constituent elements are provided with the same symbol with a suffix corresponding to the C or L band, to thereby show the respective relationships.

Furthermore, the optical amplification apparatus 4' has a configuration where the configuration on the EDFA side also respectively corresponds to the C band and the L band. More specifically, the WDM signal light input to the optical amplification apparatus 4' and passed through the optical couplers 12 is demultiplexed into a C band and an L band by a WDM coupler 51. The C band WDM signal light is sent to a C band EDFA 20$_C$ to be amplified, while the L band WDM signal light is sent to an L band EDFA 20$_L$ to be amplified. The output light from the C band EDFA 20$_C$ and the output light from the L band EDFA 20$_L$ are sent to a WDM coupler 52 to be multiplexed and then output to the transmission path. For the C band EDFA 20$_C$ and the L band EDFA 20$_L$, these may have for example the aforementioned specific configuration shown in FIG. 2.

Furthermore, in this optical-amplification apparatus 4', optical couplers 31$_C$ and 31$_L$ are respectively provided prior to the EDFAs 20$_C$ and 20$_L$ for each band, so that the input light power to the EDFAs 20$_C$ and 20$_L$ is respectively monitored by monitors 32$_C$ and 32$_L$ and then output to a computation section 40$_{CL}$. The method of monitoring the input light power to the EDFAs for each band is not limited to that described above, and may be, for example, such that the WDM signal light of both bands is branched prior to the WDM coupler 51 and then demultiplexed the branched light into each band, to be monitored.

With the third embodiment of the above described configuration, independent input interruption detection and shutdown control can be performed for each band by unitizing each construction of the prior stage Raman amplifier side and the succeeding stage EDFA side to respectively correspond to the C band and the L band.

That is to say, with the optical communication system to which the present optical amplification apparatus is applied, the WDM signal light of the C band and the WDM signal light of the L band are collectively transmitted via a single transmission path, however, it is common that the transmission control of the WDM signal light of each band is basically independently performed. For example, supervisory control signals set for each band are transmitted and received between the respective optical repeaters, and an independent control is performed for each of the C and L bands.

With such a system, even in the case where an abnormality occurs in the transmission of the WDM signal light of one band, it is desirable to maintain a normal condition for the transmission of the WDM signal light of the other band. As described above, by constructing the optical amplification apparatus to be independently for each of the bands, then even if there is an input interruption in the signal light of one band, the signal light of the other band can be normally amplified. In the case where for example an open circuit of the transmission path or a disconnection of the connector occurs, since an input interruption occurs in the signal light for both bands, high level excitation light is not emitted to the outside.

Furthermore, if the respective constructions for the Raman amplifier side and the EDFA side are unitized for each of the C and L bands, then it is possible to adopt a flexible measure such that for example a unit corresponding to the C band only is provided at the initial introduction stage of the optical amplification apparatus 4', and a unit corresponding to the L band is added as required after commencement of operation, thereby achieving an effect that the number of relatively high cost excitation light sources to be initially loaded can be reduced to suppress introduction costs.

Hereunder, one example of a specific computation method for the computation section 40$_{CL}$ in the case of performing the input interruption detection of the signal light for each of the bands as mentioned above is given.

The computation section 40$_{CL}$ computes the total powers Ass$_C$ and Ass$_L$ of the ASS light for each band, respectively, in accordance with the following equations (1$_C$) and (1$_L$), using each of the Raman excitation light powers monitored by the respective monitors 13$_{C1}$ to 13$_{Ci}$, and 13$_{L1}$ to 13$_{Li}$. Equation (1$_C$) and equation (1$_L$), are one example of relational equations for where, in the case where in the aforementioned equation (1) for example three excitation light sources are used for each band (i=3), consideration is given to the influence of inter-pump Raman and the relationship of the total power of the ASS light to the power of the Raman excitation light (FIG. 3) is approximated by a quadratic function to increase the accuracy.

$$Ass_C = cm_1 \cdot 10^{\frac{cd_2 \cdot (cp_1 \cdot Pu_1)^2 + cd_1 \cdot (cp_1 \cdot Pu_1 - d_{12} \cdot cp_1^2 \cdot Pu_1^2 \cdot cp_2 \cdot Pu_2 - d_{31} \cdot cp_3 \cdot Pu_3 \cdot cp_1^2 \cdot Pu_1^2) + cd_0}{10}} + \quad (1_C)$$

$$cm_2 \cdot 10^{\frac{cd_2 \cdot (cp_2 \cdot Pu_2)^2 + cd_1 \cdot (cp_2 \cdot Pu_2 - d_{23} \cdot cp_2^2 \cdot Pu_2^2 \cdot cp_3 \cdot Pu_3 + d_{12} \cdot cp_1 \cdot Pu_1 \cdot cp_2^2 \cdot Pu_2^2) + cd_0}{10}} + $$

$$cm_3 \cdot 10^{\frac{cd_2 \cdot (cp_3 \cdot Pu_3)^2 + cd_1 \cdot (cp_3 \cdot Pu_3 + d_{31} \cdot cp_3^2 \cdot Pu_3^2 \cdot cp_1 \cdot Pu_1 + d_{23} \cdot cp_2 \cdot Pu_2 \cdot cp_3^2 \cdot Pu_3^2) + cd_0}{10}}$$

$$Ass_L = lm_1 \cdot 10^{\frac{ld_2 \cdot (lp_1 \cdot Pu_1)^2 + ld_1 \cdot (lp_1 \cdot Pu_1 - d_{12} \cdot lp_1^2 \cdot Pu_1^2 \cdot lp_2 \cdot Pu_2 - d_{31} \cdot lp_3 \cdot Pu_3 \cdot lp_1^2 \cdot Pu_1^2) + ld_0}{10}} + \quad (1_L)$$

$$lm_2 \cdot 10^{\frac{ld_2 \cdot (lp_2 \cdot Pu_2)^2 + ld_1 \cdot (lp_2 \cdot Pu_2 - d_{23} \cdot lp_2^2 \cdot Pu_2^2 \cdot lp_3 \cdot Pu_3 + d_{12} \cdot lp_1 \cdot Pu_1 \cdot lp_2^2 \cdot Pu_2^2) + ld_0}{10}} + $$

$$lm_3 \cdot 10^{\frac{ld_2 \cdot (lp_3 \cdot Pu_3)^2 + ld_1 \cdot (lp_3 \cdot Pu_3 + d_{31} \cdot lp_3^2 \cdot Pu_3^2 \cdot lp_1 \cdot Pu_1 + d_{23} \cdot lp_2 \cdot Pu_2 \cdot lp_3^2 \cdot Pu_3^2) + ld_0}{10}}$$

wherein $P_{U1}$ to $P_{U3}$ are the Raman excitation light power generated by each excitation light source, $cm_1$ to $cm_3$, and $lm_1$ to $lm_3$ are weighting coefficients, $cd_0$ to $cd_2$ and $ld_0$ to $ld_2$ are formula coefficients, $cp_1$ to $cp_3$ and $lp_1$ to $lp_3$ are effective pump coefficients, and $d_{12}$, $d_{23}$, $d_{31}$ are inter-pump Raman coefficients.

Then, using the total power $Ass_C$ and $Ass_L$ of the ASS light for each of the bands computed according to the abovementioned equation ($1_C$) and equation ($1_L$), for example in the case of correcting the threshold value for judging an input interruption of the signal light, the post-correction threshold values $INDWN_{TH(C)}$ and $INDWN_{TH(L)}$ for each band are respectively computed for example in accordance with the following equations ($2_C$) and ($2_L$).

$$INDWN_{TH(C)} = INDWN_{TH\text{-}OLD(C)} + Ass_C \cdot INDWN_{coeff(C)} \quad (2_C)$$

$$INDWN_{TH(L)} = INDWN_{TH\text{-}OLD(L)} + ASS_L \cdot INDWN_{coeff(L)} \quad (2_L)$$

wherein $INDWN_{TH\text{-}OLD(C)}$, $INDWN_{TH\text{-}OLD(L)}$ are the pre-correction threshold values, and $INDWN_{coeff(C)}$, $INDWN_{coeff(L)}$ are the correction coefficients.

Then, the input interruption detection for each of the C and the L bands is performed by respectively comparing the post-correction threshold values $INDWN_{TH(C)}$ and $INDWN_{TH(L)}$ computed in accordance with the aforementioned equation ($2_C$) and equation ($2_L$) with each of the monitor results of the monitors $32_C$ and $32_L$ corresponding to each band.

With the abovementioned first through third embodiments, a part of the Raman excitation light emitted from the front side of the Raman excitation light source is branched by the optical coupler to be monitored. However other than this, the Raman excitation light emitted from the back side of the Raman excitation light source may be monitored. Furthermore, in the case where as in the second and third embodiments, a plurality of Raman excitation light sources are used, a part of the Raman excitation light multiplexed by the WDM coupler may be branched, and the branched light demultiplexed into each wavelength component using for example an optical filter of a narrow band, and the light power then monitored.

Moreover, with the aforementioned first through third embodiments, the transmission path connected to the input side of the optical amplification apparatus is constructed to be a Raman amplification medium. However the present invention is not limited to this, and the construction may be such that a separate Raman amplification medium is provided inside the optical amplification apparatus. For the Raman amplification medium in this case, preferably an optical fiber with a high excitation efficiency and a small mode field diameter is used.

In addition, as a specific construction for the EDFA, a two stage amplification configuration having a prior stage amplifier section and a succeeding stage amplifier section has been explained. However, the construction of the EDFA used in the present invention is not limited to this, and may be of a single stage or a three or more stage amplification configuration.

Figure 8:
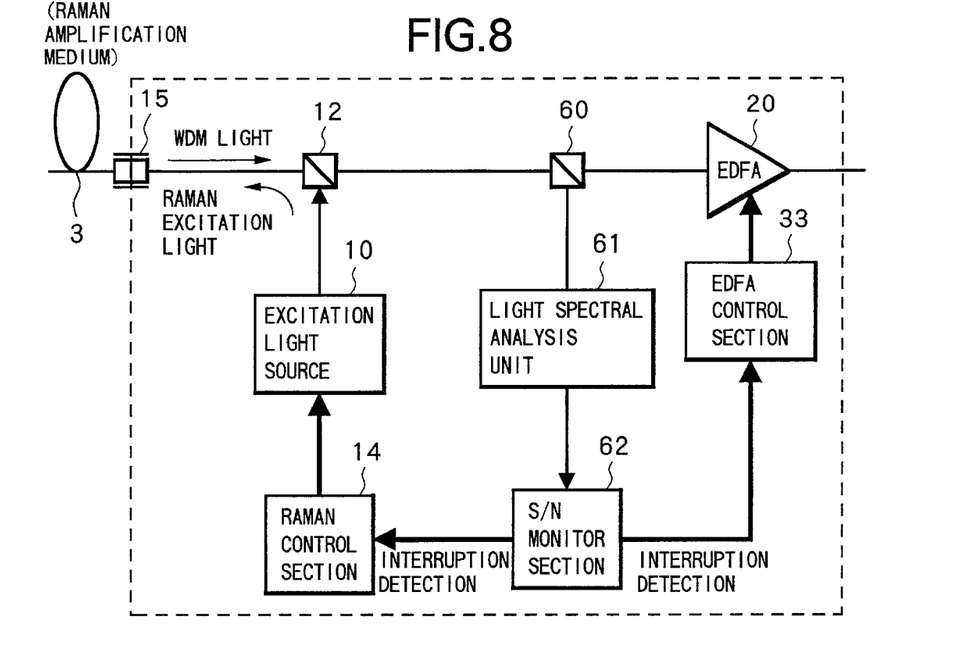
FIG. 8 is a block diagram showing a configuration example related to embodiments of the present invention, for a case where a spectrum of signal light is measured and an S/N ratio obtained to judge an input interruption.

Moreover, with the aforementioned first through third embodiments, the total power of the ASS light has been obtained by calculation using the monitor results of the power of the excitation light supplied to the Raman amplification medium, and correction has been performed based on the calculation results to thereby perform the input interruption detection of the signal light. However, the present invention is not limited to this, and for example the spectrum of the signal light propagated through the optical amplification apparatus may be directly measured to detect an input interruption. More specifically, as shown in FIG. 8, an optical coupler 60 is inserted at an optional location (before the EDFA in the figure) on the transmission path through which the signal light is propagated, inside the optical amplification apparatus, and the spectrum of the branched light of the optical coupler 60 is measured by a simple light spectral analysis unit 61, and the analysis result is sent to a S/N monitor section 62. In this S/N monitor section 62, the respective powers of the signal component (S) and the noise component (N) for the WDM signal light branched by the optical coupler 60 are obtained to detect the S/N ratio. Then, in the case where the S/N ratio for the optical signals of all of the wavelengths contained in the WDM signal light, or for the optical signal of a specific wavelength, falls below a previously set reference value, an input interruption of the signal light is judged.

Figure 9:
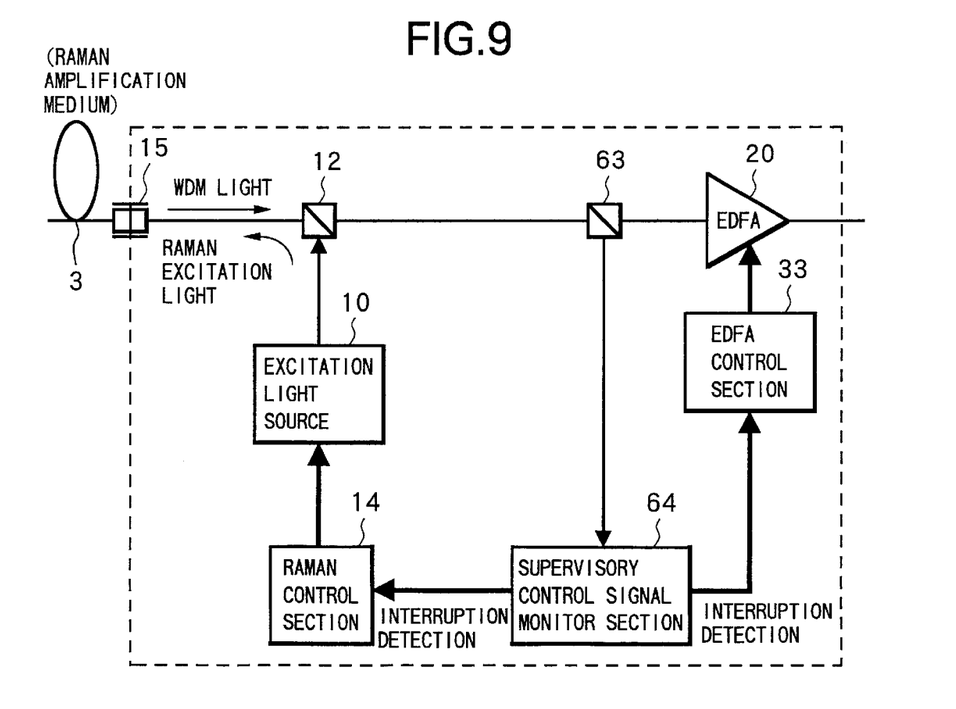
FIG. 9 is a block diagram showing a configuration example related to embodiments of the present invention, for a case where a supervisory control signal is monitored to judge an input interruption.

Moreover, for example it is also possible to judge an input interruption of the signal light by detecting a supervisory control signal (an optical signal separately arranged at an inner portion or outer portion of the signal light band) which is transmitted together with the WDM signal light. More specifically, as shown in FIG. 9, a supervisory control signal extracted by an optical coupler 63 which is inserted at an optional location (before the EDFA in the figure) on the transmission path through which the signal light is propagated, inside the optical amplifier, is sent to a supervisory control signal monitor section 64, and the presence of this supervisory control signal is detected. Then, in the case where a cutoff of the supervisory control signal is detected, an input interruption of the signal light is judged. In the case where, as with the case of the aforementioned third embodiment, control is performed for each of the C and the L bands, then it is, preferable that respectively corresponding supervisory control signals are extracted from the signal lights which have been demultiplexed into each band, and the input interruption detection is performed independently for each band.

The present invention has considerable industrial applicability for optical amplification apparatus to be used in various types of optical communication systems. In particular, the invention is useful as technology for accurate interruption detection and safety improvement in optical amplification apparatus for performing amplification of signal light by being combined with Raman amplifiers.

What is claimed:

1. An apparatus comprising:

an excitation light source pumping a Raman amplifying medium for Raman amplification;

a monitor detecting interruption of a signal light output from the Raman amplifying medium; and a controller controlling shutting down of the excitation light source when the monitor detects the interruption.

2. A method for Raman amplification comprising:

providing an excitation light for a Raman amplifying medium for Raman amplification;

detecting interruption of a signal light output from the Raman amplifying medium; and shutting down the excitation light source when the interruption is detected.

* * * * *